United States Patent
Lee (10) Patent No.: US 8,582,449 B2
(45) Date of Patent: Nov. 12, 2013

(54) APPARATUS AND METHOD FOR SETTING A DEFAULT GATEWAY ADDRESS IN A MOBILE COMMUNICATION SYSTEM

(75) Inventor: Hyun-Gu Lee, Hwaseong-si (KR)

(73) Assignee: Samsung Electronics Co., Ltd (KR)

(*) Notice: Subject to any disclaimer, the term of this patent is extended or adjusted under 35 U.S.C. 154(b) by 1028 days.

(21) Appl. No.: 12/351,390

(22) Filed: Jan. 9, 2009

(65) Prior Publication Data

US 2009/0213792 A1    Aug. 27, 2009

(30) Foreign Application Priority Data

Jan. 10, 2008    (KR) .................. 10-2008-0002865

(51) Int. Cl.
*H04J 1/16*    (2006.01)
(52) U.S. Cl.
USPC ........ 370/252; 370/331; 455/435.1; 455/436; 709/226; 709/228

(58) Field of Classification Search
USPC ......... 370/328, 254, 351, 352, 353, 355, 356, 370/252, 331; 709/226, 228, 243; 455/435.1, 436
See application file for complete search history.

(56) References Cited

U.S. PATENT DOCUMENTS

| | | | |
|---|---|---|---|
| 2004/0109452 A1* | 6/2004 | Takihiro et al. | 370/392 |
| 2004/0202126 A1* | 10/2004 | Leung et al. | 370/331 |
| 2008/0108349 A1* | 5/2008 | Ihattula | 455/435.1 |

* cited by examiner

*Primary Examiner* — Dady Chery
(74) *Attorney, Agent, or Firm* — The Farrell Law Firm, P.C.

(57) ABSTRACT

An apparatus and method for setting a default gateway address of a mobile terminal (MT). In the method, address configuration information is received from a network device. An address different from a Packet Data Protocol (PDP) included in the address configuration information is configured as a network address of the default gateway. Filtering is performed on a packet received by the mobile terminal.

22 Claims, 6 Drawing Sheets

APPARATUS AND METHOD FOR SETTING A DEFAULT GATEWAY ADDRESS IN A MOBILE COMMUNICATION SYSTEM

PRIORITY

This application claims priority under 35 U.S.C. §119 to an application filed in the Korean Intellectual Property Office on Jan. 10, 2008 and assigned Serial No. 10-2008-0002865, the contents of which are incorporated herein by reference.

BACKGROUND OF THE INVENTION

1. Field of the Invention

The present invention relates generally to an apparatus and a method for setting a default gateway address that is required when the Internet is used through an Ethernet interface between Terminal Equipment (TE) and a Mobile Terminal (MT) when a $3^{rd}$ Generation Partnership Project (3GPP) wireless terminal performs wireless data communication using the TE.

2. Description of the Related Art

A mobile terminal in the 3GPP can be used as a dial-up modem using a Universal Serial Bus (USB), and be connected to TE, so that a user can use wireless data communication function.

For wireless data connection using wireless data, an initial modem setting procedure using an ATtention (AT) command, which is a modem command, and a dial-up procedure to a relevant connection phone number are performed. After the dial-up procedure, authentication and Internet Protocol (IP) address assignment procedures are performed using a Point-to-Point Protocol (PPP), so that a wireless data connection procedure is completed.

During a PPP connection procedure, a client IP address and a Domain Name System (DNS) IP address are assigned, but a default gateway address is not assigned because the PPP is a point-to-point protocol, and thus, a routing concept does not exist therein.

In a current 3GPP network, particularly, a Wideband Code Division Multiple Access (WCDMA) network, as the bandwidth of packet data communication continually increases, PPP processing at a wireless terminal causes a great burden in high-speed data processing.

To perform PPP framing/un-framing in a software manner, byte stuffing/de-stuffing is performed at every octet.

As data traffic that should be processed by a wireless terminal gradually has a high-speed characteristic of tens of Mbps or more, corresponding PPP processing burdens a Central Processing Unit (CPU). When such a burden increases, a CPU clock frequency should increases in order to meet an object performance.

However, when the CPU clock frequency is increased, power consumption of a wireless terminal also increases. In order to solve this limitation, a method of using Ethernet communication instead of a PPP is being considered.

In an Ethernet communication scheme, a TE should be assigned a default gateway address through a Dynamic Host Configuration Protocol (DHCP). However, in the current 3GPP standard, a procedure for assigning a default gateway address is not at all defined. Accordingly, a wireless terminal is assigned a Packet Data Protocol (PDP) address and a DNS server address from a network through Session Management (SM) signaling, but is not assigned a default gateway address. The PDIP address represents an IP address.

After a session management procedure, a DHCP procedure is performed between TE and a MT. During this procedure, IP configuration information including a default gateway address should be transferred to the TE. When the default gateway address cannot be transferred to the TE, the Internet cannot be used.

SUMMARY OF THE INVENTION

The present invention has been designed to address at least the problems and/or disadvantages described above and to provide at least the advantages described below. Accordingly, an aspect of the present invention is to provide an apparatus and a method for setting a default gateway address in a mobile communication system.

Another aspect of the present invention is to provide a method and an apparatus for assigning a default gateway address in order to relieve a CPU processing burden that is caused by PPP processing when a 3GPP wireless terminal uses an Ethernet as a data link protocol with TE.

Another aspect of the present invention is to provide an apparatus and a method for providing an escape function in preparation for a situation in which collusion with a different host or a different router existing on a network can occur when a 3GPP wireless terminal virtually uses an Ethernet hardware address of a default gateway.

In accordance with an aspect of the present invention, a method for setting a default gateway address of a mobile terminal includes receiving address configuration information from a network device; setting an address different from a Packet Data Protocol (PDP) address included in the address configuration information as a network address of a default gateway; and filtering a packet received by the mobile terminal.

In accordance with another aspect of the present invention, an apparatus of a mobile terminal, for setting a default gateway address of the mobile terminal includes a mobile communication unit for receiving address configuration information and a packet from a network device to provide them to an Internet Protocol (IP) configuration management unit, and transmitting a packet from the IP configuration management unit to the network device; the IP configuration management unit for setting an address different from a Packet Data Protocol (PDP) address included in the address configuration information as a network address of the default gateway, filtering and processing a packet provided by an Ethernet unit, providing the filtered packet to the mobile communication unit or the Ethernet unit, and providing a packet provided by the mobile communication unit to the Ethernet unit; and the Ethernet unit for generating an Ethernet packet including an IP packet provided by the mobile communication unit and the IP configuration management unit to transmit the generated Ethernet packet to terminal equipment, and for obtaining the IP packet from the Ethernet packet received from the TE to provide the obtained IP packet to the IP configuration management unit.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE PRESENT INVENTION

Embodiments of the present invention will be described herein below with reference to the accompanying drawings. In the following description, well-known functions or constructions are not described in detail because they would obscure the invention in unnecessary detail.

Various embodiments of the present invention provide an apparatus and a method for setting a default gateway address in a mobile communication system.

For an Internet connection using an Ethernet, an IP address, an Ethernet hardware address, a default gateway address, and a DNS address are used. However, because the 3GPP standard is not concerned in an interface between a Mobile Terminal (MT) and Terminal Equipment (TE), the 3GPP standard does not manage the Ethernet hardware address, and does not manage the default gateway address. Therefore, a technique for a TE, such as a Personal Computer (PC), to set a default gateway address, and a method for informing an Ethernet hardware address of a target terminal are required.

Further, because the 3GPP standard does not define a procedure for informing a wireless terminal of a default gateway address, the wireless terminal should obtain the default gateway address by itself. For this purpose, three procedures below for the wireless terminal to obtain the default gateway address by itself are described below.

First, an embodiment of the present invention provides a method of using a Domain Name System (DNS) lookup for Gateway GPRS (General Packet Radio Service) Service Node (GGSN) using an Access Point Name (APN), which is a domain name. In this method, a DNS server on a network obtains an IP address of a router by responding using an address of a host having a relevant domain name. This IP address is an address of a default gateway address.

Second, an embodiment of the present invention provides a method of using an Internet Control Message Protocol (ICMP) router solicitation message. In this method, to confirm existence of a router on a network, the router (default gateway) responds using an Advertisement Message including a default gateway address in response to the ICMP router solicitation message.

Third, an embodiment of the present invention provides a method that assigns an arbitrary address within a subnet. In this method, when a PDIP address=a.b.c.d is assigned through a session management procedure, a default gateway address=a.b.c.1 is set. If the assigned PDIP address is a.b.c.1, the default gateway address=a.b.c.2 is set. Such a procedure can be performed by an IP configuration management unit which will later be described more detail herein below. The PDP address represents an IP address.

Additionally, when an Ethernet transmits an IP packet to a default gateway, an Ethernet hardware address of the default gateway is required. Generally, in an Ethernet, it is possible that TE obtains a hardware address of a default gateway by transmitting an Address Resolution Protocol (ARP) request packet to the default gateway, and receiving a response. However, in a 3GPP core network, processing of an ARP packet received from a wireless access network is not guaranteed. Therefore, a mobile terminal can perform an ARP response by playing a role of a default gateway by itself. That is, the address of the mobile terminal is set to be the same as a default gateway address.

If the default gateway address is set to be the same as the address of a certain host or router on a network, the mobile terminal immediately transfers an IP packet from TE to the network. For this purpose, an IP packet classifying unit, which will later be described in more detail, transfers IP packets, except for ARP and DHCP packets, to an IP packet relay unit.

An ARP proxy unit is configured to process responses to ARP request packets regarding all target terminals inside the same subnet. The ARP proxy unit maps Ethernet hardware addresses for all TEs inside the same subnet to Ethernet hardware addresses of the MT itself. Alternatively, depending on the situation, when a different TE is inside the same subnet, the ARP proxy unit can also respond using an Ethernet hardware address of the TE.

Figure 1:
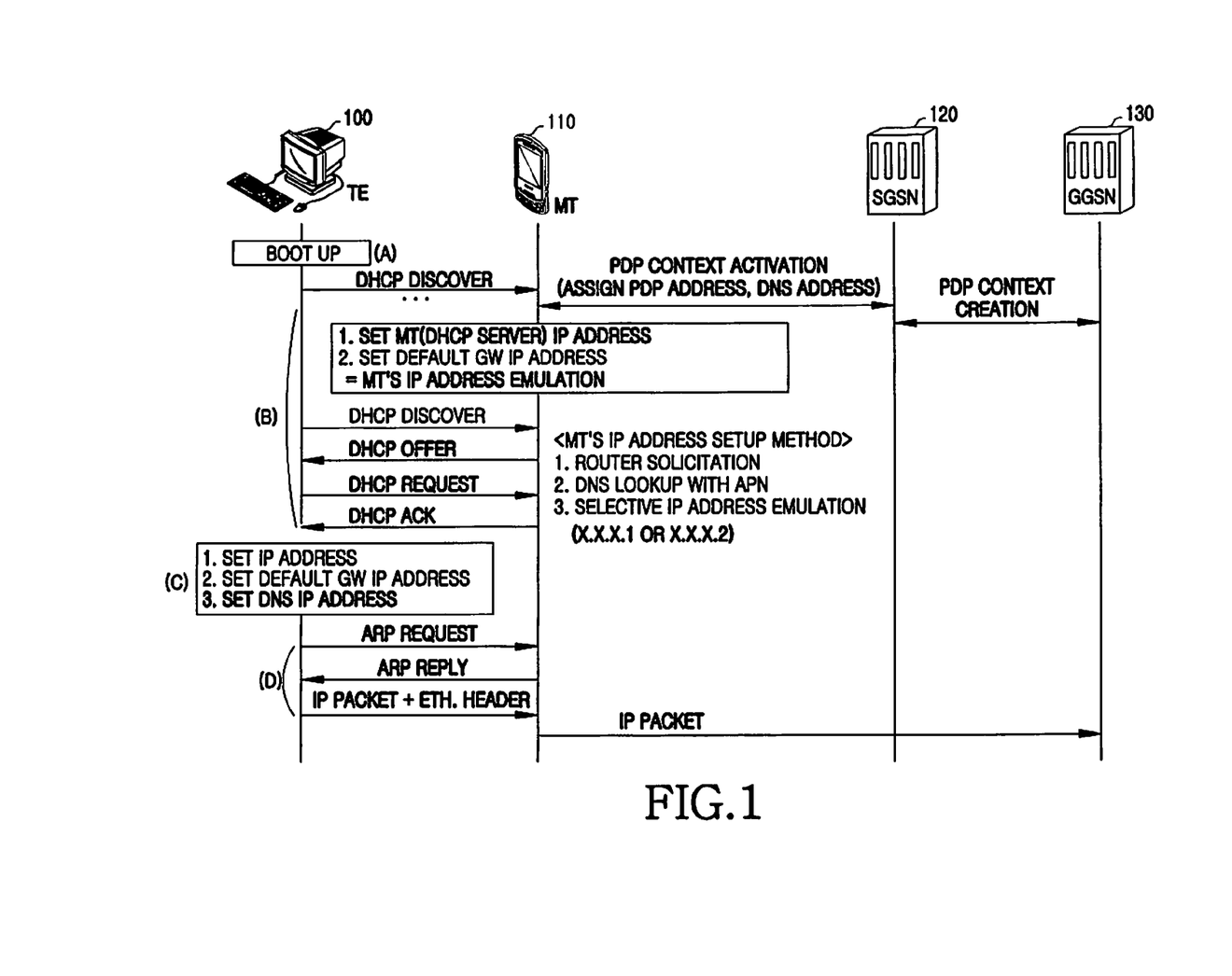
FIG. 1 is a schematic view illustrating an IP communication procedure according to an embodiment of the present invention.

FIG. 1 is a schematic view illustrating an IP communication procedure according to an embodiment of the present invention.

Referring to FIG. 1, during booting (step A) or while updating an IP address, a TE 100 performs a DHCP address assignment procedure (process B).

More specifically, in process B, when receiving a DHCP request from the TE 100, the MT 110 performs a PDP context activation process with an upper node 120 (Serving GPRS Support Node (SGSN)). The upper node 120 (SGSN) is assigned an IP address and a DNS address by performing a PDP context creation process with another upper node 130 (Gateway GPRS Support Node (GGSN)), and provides the addresses to the MT 110. The MT 110 stores the provided IP address and DNS address, and obtains or creates a default gateway address for the TE 100.

The process of obtaining the default gateway address includes obtaining the address of the another upper node 130 (GGSN) through a DNS lookup process for the another upper node 130 (GGSN) using APN, which is the above-described domain name, and setting the obtained address as a default gateway address.

Another process of obtaining the default gateway address includes receiving an Advertisement Message including a default gateway address transmitted by a router in response to an ICMP router solicitation message using the above-described ICMP router solicitation message, and obtaining the default gateway address.

The process of creating the default gateway address includes setting a default gateway address by assigning an arbitrary address inside a subnet.

After the default gateway address is determined, i.e., either obtained or created, the MT 110 provides the TE 100 with the default gateway address, the IP address, and the DNS address created by the above process in response to a DHCP request. The TE 100 then sets the provided default gateway address, IP address, and DNS address as its default gateway address, IP address, and DNS address (step C).

Thereafter, the TE 100 performs IP communication using a general process of the IP communication (step D), i.e., sends an ARP request to the MT 110, receives ARP reply from the MT 110, and then transmits the IP packet and an Ethernet header to the MT 110.

Figure 2:
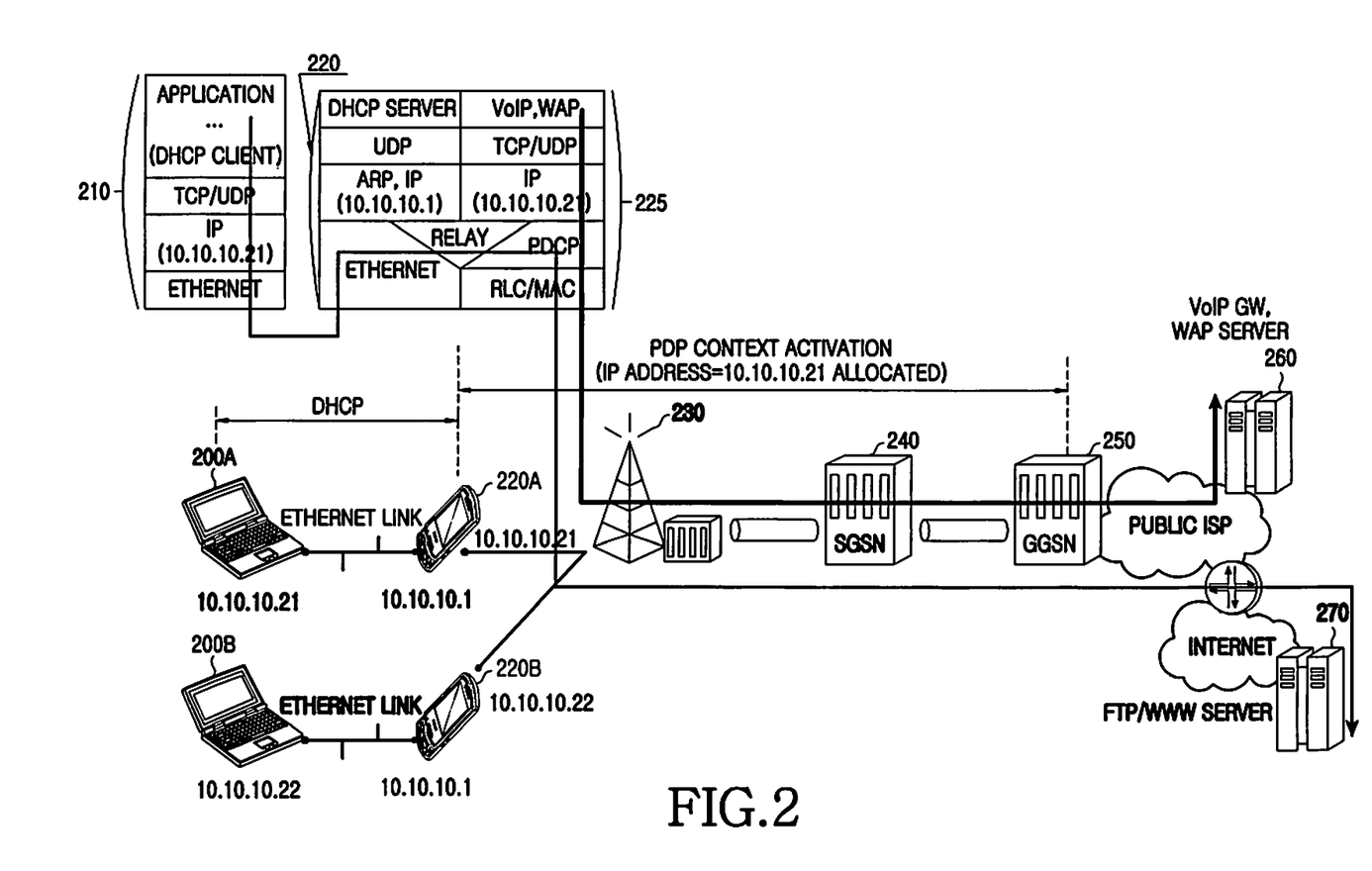
FIG. 2 is a schematic view illustrating a protocol stack during IP communication according to an embodiment of the present invention.

FIG. 2 is a schematic view illustrating a protocol stack during IP communication according to an embodiment of the present invention.

Referring to FIG. 2, a protocol stack 210 of TE 200a and a protocol stack 225 of an MT 220a are illustrated. ARP, IP in the protocol stack 225 represents one of the IP addresses of the MT 220A. In the example illustrated in FIG. 2, MT 220A has two IP addresses. One of the IP addresses is assigned through a base station 230 and an SGSN 240 by an upper network device 250 (GGSN) for external routing. This address is assigned to the MT 220A.

Also, the other IP address, that is, ARP, IP represents an address when the above-described default gateway address is created. The ARP, IP is used for obtaining the hardware address of the MT 220A. When the MT 220A receives a hardware address request from a default gateway using ARP, the MT 220A transmits its own hardware address as a response.

The TE 200A and the MT 220A use the same IP address, and the MT 220A relays an IP packet transmitted by the TE 200A as if the IP packet were transmitted by the MT 220A, thereby communicating with other target nodes 260 and 270.

If, as illustrated in FIG. 2, the MT 220A does not create a default gateway address, but obtains the default gateway address, the obtained gateway IP address is used as an ARP, IP address.

Figure 3:
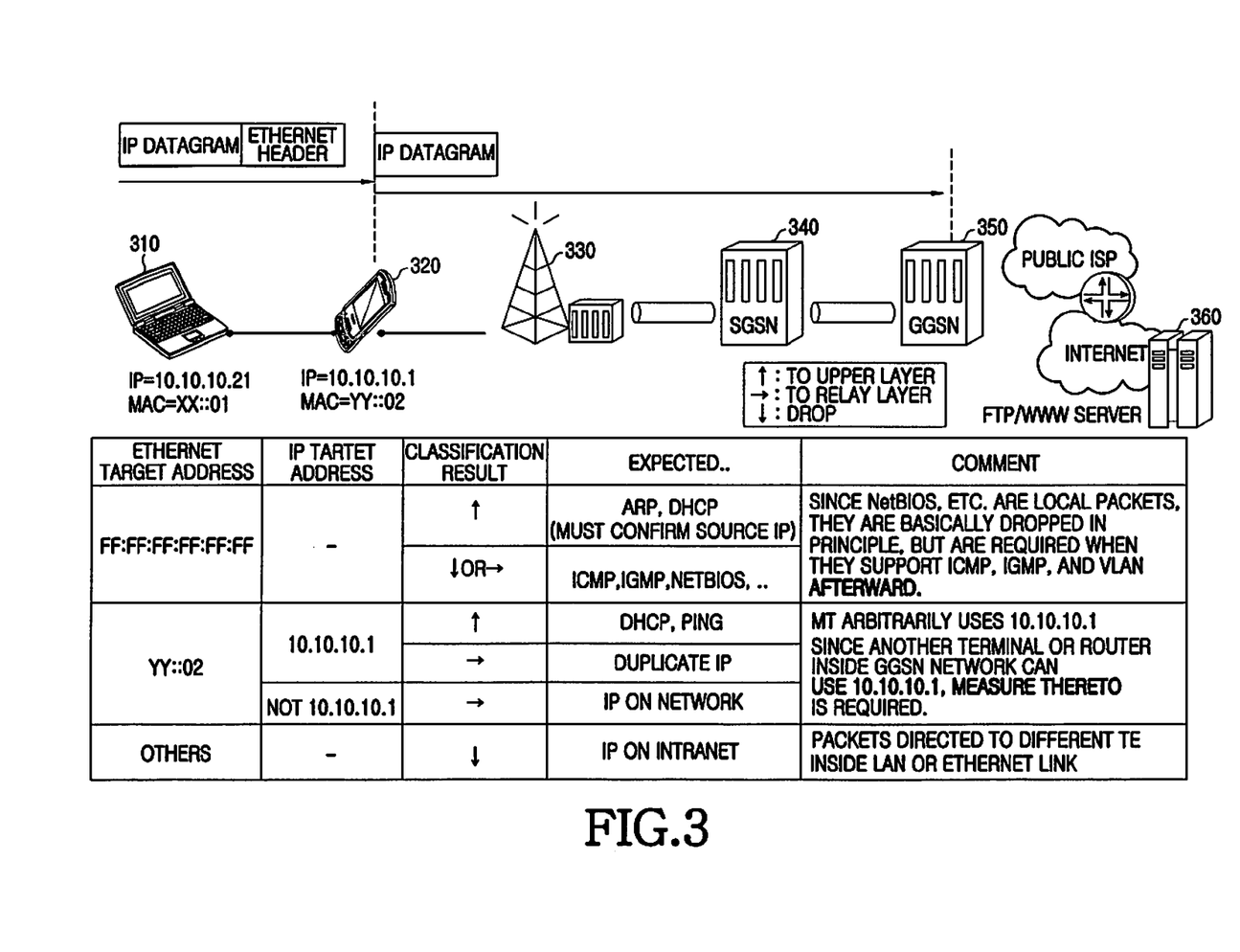
FIG. 3 is a view illustrating a filtering rule for an IP packet according to an embodiment of the present invention.

FIG. 3 is a view illustrating a filtering rule for an IP packet according to an embodiment of the present invention.

Referring to FIG. 3, the IP address of TE 310 is 10.10.20.21, the media access point (MAC) address, i.e., the hardware address, of the TE 310 is xx::01, the IP address of an MT 320 is 10.10.10.1, and the hardware address of the MT 320 is yy::02.

When the target address of an Ethernet packet transmitted by the TE 310 is a broadcast address (FF:FF:FF:FF:FF:FF), the MT 320 processes and transfers a packet of a supported protocol (for example, ARP and DHCP) to an upper layer, drops a packet of an unsupported protocol or relays, and transfers the packet to an upper node 350 (GGSN).

When the target address (hardware address) of an Ethernet packet transmitted by the TE 310 is the address of the MT 320, and the target IP address is 10.10.10.1, i.e., the default gateway address, the MT 320 transfers a packet to an upper layer and processes the packet when the packet being transmitted is a packet (particularly, control packet) having a DHCP or PING value that is directed to the MT 320.

When the target address of an Ethernet packet transmitted by the TE 310 is the address of the MT 320, and the target IP address is 10.10.10.1, i.e., the default gateway address, the MT 320 relays a packet and transfers the packet to the upper node 350 (GGSN), because the packet being transmitted is not a control packet but a general packet when there is a different node using the IP address (10.10.10.1). In this case, the relayed packet passes through a base station 330 and an SGSN 340.

When the target address of an Ethernet packet transmitted by the TE 310 is the address of the MT 320, and the target IP address is not 10.10.10.1, i.e., the default gateway address, the packet should be transmitted to the outside. Therefore, as illustrated in FIG. 3, the packet is relayed and transmitted to the upper node 350 (GGSN). In this case, the relayed packet passes through the base station 330 and the SGSN 340. The upper node 350 (GGSN) receives the relayed packet and routes the received packet a corresponding target (for example, server 360).

When the target address of an Ethernet packet transmitted by the TE 310 is not the address of the MT 320, the packet is directed to a different node on an Ethernet link. Accordingly, the TE 310 drops the packet.

Figure 4:
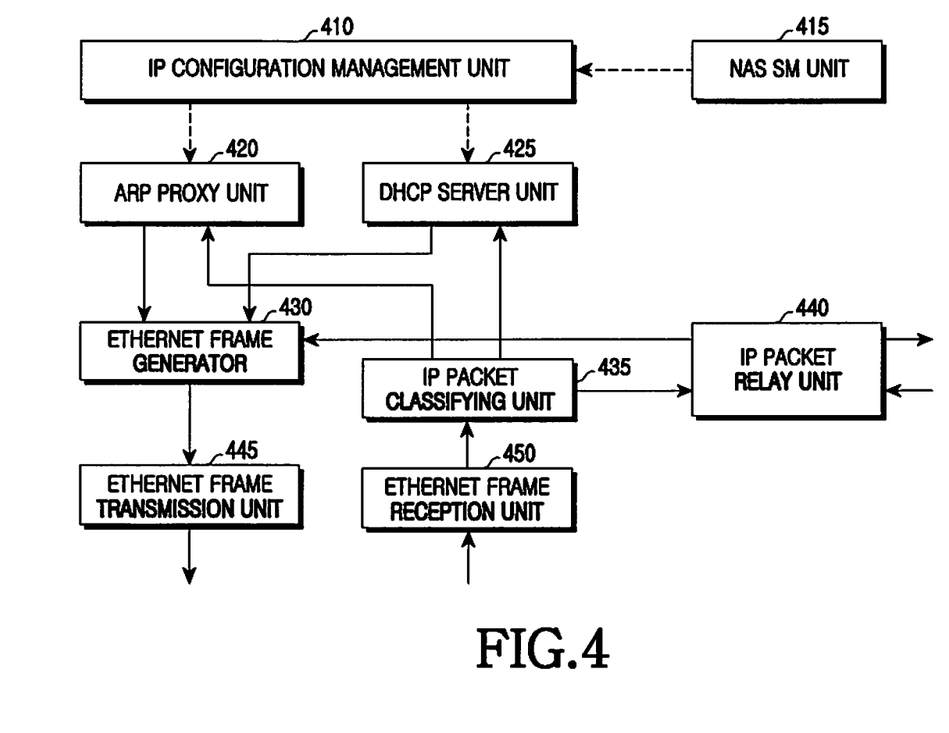
FIG. 4 is a block diagram illustrating a mobile terminal according to an embodiment of the present invention.

FIG. 4 is a block diagram illustrating an MT according to an embodiment of the present invention.

Referring to FIG. 4, the MT includes a Non Access Stratum (NAS) Session Management (SM) unit 415, an IP configuration management 410, an ARP proxy unit 420, a DHCP server unit 425, an Ethernet frame generator 430, an IP packet classifying unit 435, an IP packet relay unit 440, an Ethernet frame transmission unit 445, and an Ethernet frame reception unit 450.

Further, in FIG. 4, a dashed line represents a signaling path, and a solid line represents a signaling and traffic path.

When accessing a network, the NAS SM unit 415 is assigned information such as an IP address and a DNS address by a network device, and provides the assigned information to the IP configuration management unit 410.

The IP configuration management unit 410 controls the ARP proxy unit 420, the DHCP server unit 425, the Ethernet frame generator 430, the IP packet classifying unit 435, the Ethernet frame transmission unit 445, and the Ethernet frame reception unit 450 using the assigned IP address and DNS address. Also, the IP configuration management unit 410 obtains or creates a default gateway address using the above-described methods for determining the default gateway address.

The ARP proxy unit 420 creates an IP packet having a hardware address of itself as a response, instead of the hardware address of an actual target terminal, and provides the created IP packet to the Ethernet frame generator 430 in response to an ARP request packet transmitted by TE. If a plurality of TEs are connected on a network under the MT, the ARP proxy unit 420 can transfer the hardware address of a relevant TE as a response.

When receiving an IP address assignment request using a DHCP from the TE, the DHCP server unit 425 creates an IP packet including an IP address provided by the IP address configuration unit 410, and provides the created IP packet to the Ethernet frame generator 430.

The Ethernet frame generator 430 generates an Ethernet frame in order to transmit an IP packet including information provided by the ARP proxy unit 420 and the DHCP server unit 425 to the TE, and provides the generated Ethernet frame to the Ethernet frame transmission unit 445. Alternatively, the Ethernet frame generator 430 generates an Ethernet frame in order to transmit an IP packet from an upper network device, provided by the IP packet relay unit 440, to the TE, and provides the generated Ethernet frame to the Ethernet frame transmission unit 445.

The Ethernet frame transmission unit 445 transmits the Ethernet frame generated by the Ethernet frame generator 430 to the TE.

The Ethernet frame reception unit 450 receives an Ethernet frame from the TE and provides the received Ethernet frame to the IP packet classifying unit 435.

The IP packet classifying unit 435 removes an Ethernet header of the received Ethernet frame, performs the filtering and packet classification (as illustrated in FIG. 3) to provide an IP packet to be provided to an upper network device, to the IP packet relay unit 440, and provide an IP packet to be processed by the MT, to the DHCP server unit 425 or the ARP proxy unit 420 depending on the type of the IP packet.

When receiving an IP packet from an upper network device, the IP packet relay unit 440 provides the received IP packet to the Ethernet frame generator 430.

Although illustrated as separate units for ease of description, a functional block (or unit) for processing mobile communication, i.e., a mobile communication unit, can replace the functions of the NAS SM unit 415 and the IP packet relay unit 440.

Alternatively, the ARP proxy unit 420, the DHCP server unit 425, and the IP packet classifying unit 435 could be performed by the IP configuration management unit 410.

Although illustrated as separate units for ease of description, a functional block (unit) for processing an Ethernet protocol of the MT, i.e., an Ethernet unit, can also replace the functions of the Ethernet frame generator 430, the Ethernet frame transmission unit 445, and the Ethernet frame reception unit 450.

Figure 5:
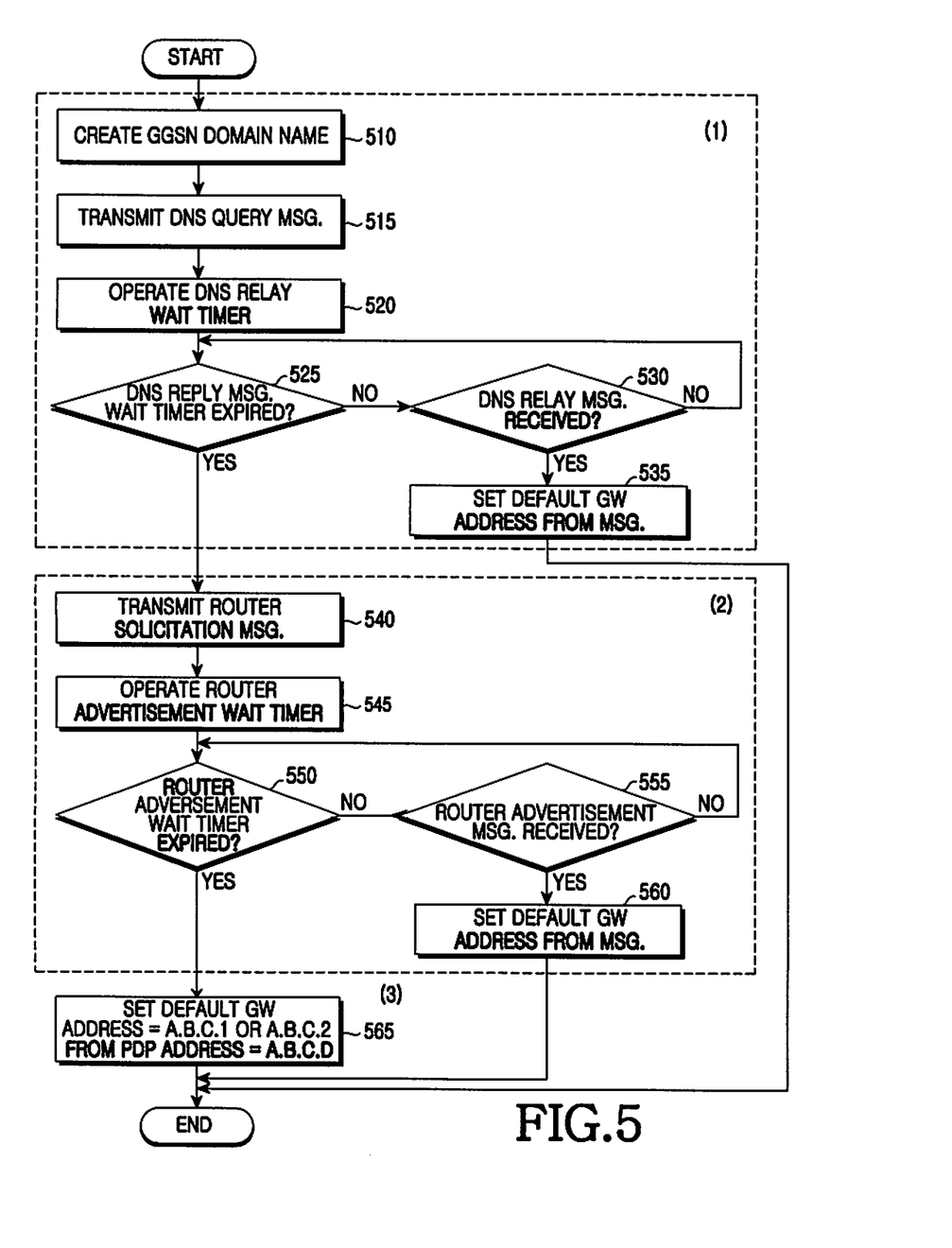
FIG. 5 is a flowchart illustrating a default gateway address setting procedure of an IP address configuration unit according to an embodiment of the present invention.

FIG. 5 is a flowchart illustrating a default gateway address setting procedure of an IP address configuration unit according to an embodiment of the present invention. In FIG. 5, process (1) represents a default gateway address obtaining process using a DNS lookup, process (2) represents a default gateway address obtaining process using a router request, process (3) represents a default gateway emulation process using arbitrary configuration of a default gateway address. Process (3) will be described in detail with reference to FIG. 6.

Referring to FIG. 5, after booting, or when an IP address reconfiguration process starts, an MT creates a GGSN domain name in step 510, and transmits a DNS query message to a network device in order to obtain the IP address of a GGSN using a DNS address obtained from the network device in step 515. Thereafter, a timer for the DNS query message is started in step 520.

If a response is received before the timer expires in steps 525 and 530, a default gateway address is obtained from the response and configured in step 535. However, if a response is not received prior to the timer expiring in steps 525 and 530, process (2) starts.

Referring to process (2), to obtain the IP address of the GGSN, a router solicitation message is transmitted in step 540. Thereafter, a timer for the router Advertisement Message is started in step 545.

If a response is received before the timer expires in steps 550 and 555, a default gateway address is obtained from the response and configured in step 560. However, if a response is not received by the time the timer expires in steps 550 and 555, process (3) starts.

Referring to process (3), a default gateway address is configured with reference to an IP address (PDIP address) assigned to the MT in step 565. If the assigned IP address is a.b.c.d, the default gateway address is configured to a.b.c.1 or a.b.c.2.

Figure 6:
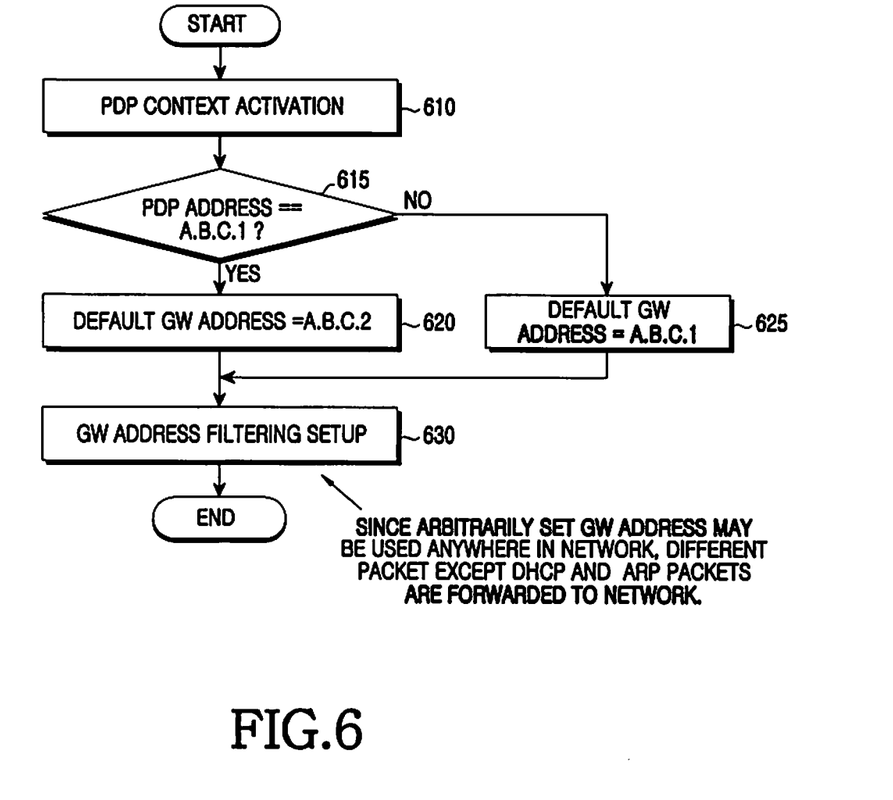
FIG. 6 is a flowchart illustrating a default gateway address setting procedure of an IP address configuration unit according to an embodiment of the present invention.

FIG. 6 is a flowchart illustrating a default gateway address setting procedure of an IP address configuration unit according to an embodiment of the present invention. More specifically, FIG. 6 illustrates process (3) of FIG. 5 in more detail.

Referring to FIG. 6, an MT is assigned an IP address (PDIP address) through a PDP context activation process by a network device in step 610. When the obtained IP address is a.b.c 1, for example, in step 615, a.b.c.2 is configured as an IP address of a default gateway in step 620. However, when the obtained IP address is not a.b.c.1 in step 615, a.b.c.1 is configured as the IP address of the default gateway in step 625. That is, an IP address different from the assigned IP address is configured as the IP address of the default gateway.

In step 630, the IP packet filtering process described in FIG. 3 is performed, and the procedure is ended.

A 3GPP wireless terminal in accordance with the above-described embodiments of the present invention relieves a burden normally caused by PPP processing using Ethernet communication scheme, thereby enabling high speed data communication of tens of Mbps or more and reducing power consumption of an MT.

Although the present invention has been shown and described with reference to certain embodiments thereof, it will be understood by those skilled in the art that various changes in form and details may be made therein without departing from the spirit and scope of the present invention as defined by the appended claims. Therefore, the scope of the present invention should not be limited to the above-described embodiments but should be determined by the appended claims and the equivalents thereof.

What is claimed is:

1. A method for setting a default gateway address of a mobile terminal in a mobile communication system, the method comprising:

receiving address configuration information from a network device;

setting an address different from a Packet Data Protocol (PDP) address included in the address configuration information as a network address of a default gateway; and filtering a packet, transmitted from a Terminal Equipment (TE), received by the mobile terminal, wherein the PDP address and the network address of the default gateway are set to the mobile terminal, and wherein the PDP address is set to the TE.

2. The method of claim 1, wherein each of the network address and the PDP address comprises an Internet Protocol (IP) address.

3. The method of claim 1, wherein a hardware address of the packet comprises a Media Access Control (MAC) address.

4. The method of claim 1, wherein filtering the packet comprises:

identifying a target hardware address of the received packet as an address of the mobile terminal;

identifying a target IP address of the received packet as the network address of the default gateway;

identifying the received packet as a control packet that is processable by the mobile terminal;

processing the received packet at the mobile terminal; and transmitting a response to the processing of the received packet to the TE that transmitted the received packet.

5. The method of claim 1, wherein filtering the packet comprises:

identifying a target hardware address of the received packet as an address of the mobile terminal;

identifying a target IP address of the received packet as the network address of the default gateway;

identifying the received packet as a control packet that is not processable by the mobile terminal; and transmitting the received packet to a network.

6. The method of claim 1, wherein filtering the packet comprises:

identifying a target hardware address of the received packet as a broadcast address that is not processable by the mobile terminal; and dropping the received packet.

7. The method of claim 1, wherein filtering the packet comprises:

identifying a target hardware address of the received packet as a broadcast address;

identifying that the mobile terminal supports a protocol of the received packet;

processing the received packet at the mobile terminal; and transmitting a response to the processing of the received packet to the TE that transmitted the received packet.

8. The method of claim 1, wherein filtering the packet comprises:
identifying a target hardware address of the received packet as an address of the mobile terminal;
identifying a target IP address of the received packet is not the network address of the default gateway; and
transmitting the received packet to a network.

9. The method of claim 1, wherein filtering the packet comprises:
identifying a target hardware address of the received packet is not an address of the mobile terminal; and
dropping the received packet.

10. The method of claim 1, wherein filtering the packet comprises:
identifying a target hardware address of the received packet is not an address of the mobile terminal; and
transmitting the received packet to the TE having a hardware address that corresponds with the identified target hardware address.

11. The method of claim 1, wherein the address configuration information comprises at least one of a Domain Name System (DNS) address and the PDP address.

12. An apparatus of a mobile terminal, for setting a default gateway address of the mobile terminal, the apparatus comprising:
a mobile communication unit;
an Internet Protocol (IP) configuration management unit; and
an Ethernet unit,
wherein the mobile communication unit receives address configuration information and a packet from a network device, provides the address configuration information and the packet from the network device to the IP configuration management unit, and transmits a packet from the IP configuration management unit to the network device,
wherein the IP configuration management unit sets an address different from a Packet Data Protocol (PDP) address included in the address configuration information as a network address of the default gateway, filters a packet, transmitted from a Terminal Equipment (TE), provided by the Ethernet unit, provides the filtered packet to the mobile communication unit or the Ethernet unit, and provides the packet provided by the mobile communicant unit to the Ethernet unit, and
wherein the Ethernet unit generates an Ethernet packet including an IP packet provided by the mobile communication unit and the IP configuration management unit in order to transmit the generated Ethernet packet to the TE, obtains an IP packet from the Ethernet packet received from the TE, and provides the obtained IP packet to the IP configuration management unit,
wherein both the PDP address and the network address of the default gateway are set to the mobile terminal, and
wherein the PDP address is set to the TE.

13. The apparatus of claim 12, wherein each of the network address and the PDP address comprises an Internet Protocol (IP) address.

14. The apparatus of claim 12, wherein a hardware address of the packet comprises a Media Access Control (MAC) address.

15. The apparatus of claim 12, wherein when a target hardware address of the packet provided by the Ethernet unit is an address of the mobile terminal, a target IP address of the packet provided by the Ethernet unit is the network address of the default gateway, and the packet provided by the Ethernet unit is a control packet that is processable by the IP configuration management unit, the IP configuration management filters the packet provided by the Ethernet unit by processing the packet provided by the Ethernet unit and transmitting a response to the processing of the packet provided by the Ethernet unit to the Ethernet unit.

16. The apparatus of claim 12, wherein when a target hardware address of the packet provided by the Ethernet unit is an address of the mobile terminal, a target IP address of the packet provided by the Ethernet unit is the network address of the default gateway, and the packet provided by the Ethernet unit is a control packet that is not processable by the mobile terminal, the IP configuration management unit filters the packet provided by the Ethernet unit by providing the packet provided by the Ethernet unit to the mobile communication unit.

17. The apparatus of claim 12, wherein when a target hardware address of the packet provided by the Ethernet unit is a broadcast address that is not processable by the mobile terminal, the IP configuration management unit filters the packet provided by the Ethernet unit by dropping the packet provided by the Ethernet unit.

18. The apparatus of claim 12, wherein when a target hardware address of the packet provided by the Ethernet unit is a broadcast address and the mobile terminal supports a protocol of the packet provided by the Ethernet unit, the IP configuration management unit filters the packet provided by the Ethernet unit by processing the packet provided by the Ethernet unit and transmitting a response to the processing of the packet provided by the Ethernet unit to the Ethernet unit.

19. The apparatus of claim 12, wherein when a target hardware address of the packet provided by the Ethernet unit is an address of the mobile terminal, and a target IP address of the packet provided by the Ethernet unit is not the network address of the default gateway, the IP configuration management unit filters the packet provided by the Ethernet unit by providing the packet provided by the Ethernet unit to the mobile communication unit.

20. The apparatus of claim 12, wherein when a target hardware address of the packet provided by the Ethernet unit is not an address of the mobile terminal, the IP configuration management unit filters the packet provided by the Ethernet unit by dropping the packet provided by the Ethernet unit.

21. The apparatus of claim 12, wherein when a target hardware address of the packet provided by the Ethernet unit is not an address of the mobile terminal, the IP configuration management unit filters the packet provided by the Ethernet unit by providing the packet provided by the Ethernet unit to the Ethernet unit in order to transmit the packet provided by the Ethernet unit to the TE having a hardware address that corresponds with the target hardware address.

22. The apparatus of claim 12, wherein the address configuration information comprises at least one of a Domain Name System (DNS) address and the PDP address.

* * * * *